Feb. 9, 1943. B. J. DENNISON 2,310,402
GLASS INSULATION UNIT
Filed Feb. 28, 1941

Inventor
B. J. DENNISON

By Olen E. Bee
Attorney

Patented Feb. 9, 1943

2,310,402

UNITED STATES PATENT OFFICE 2,310,402

GLASS INSULATION UNIT

Brook J. Dennison, Aspinwall, Pa., assignor to Pittsburgh Plate Glass Company, Allegheny County, Pa., a corporation of Pennsylvania Application February 28, 1941, Serial No. 381,059

2 Claims. (Cl. 20—56.5)

The present invention relates to glazing constructions and more particularly to a glass insulation unit.

One object of the invention is to provide a metal edge seal for an insulation unit which will be an effective barrier against moisture infiltration.

A second object of the invention is to provide a sealed glass insulation unit in which the vapor barrier is made an integral part thereof.

Other objects and advantages of the invention will be more apparent from the following detailed description of a preferred embodiment thereof.

The customary multiple glazed structure includes a plurality of glass plates maintained in spaced parallel relation to form an air chamber which is sealed from communication with the atmosphere. In some instances, the spacing media also serves to form the seal. In others, a vitreous or metal seal is applied to the edges of the structure.

For certain installations, it is desirable to maintain a high safety factor, and accordingly plates of laminated glass are employed in the assembly. Manifestly, it is not practicable to subject laminated glass to high temperatures in order to apply thereto a vitreous seal or a direct metal to glass bond, for there would be an accompanying destruction of the reinforcing interlayer of the laminated glass. Yet the so-called "breathing" action occasioned by differentials of pressure and temperature operating on a multiple glazed unit during service ruptures rather easily edge seals formed from organic bonding materials and permits passage therethrough of water vapor and foreign matter which affect the efficiency of the unit.

Briefly stated, the present invention contemplates the combination of plates of laminated glass, having as an integral part thereof a flexible metal border projecting beyond the edges of the plates, into an insulation unit and a union between the metal borders to form a seal for the unit.

Figure 1:
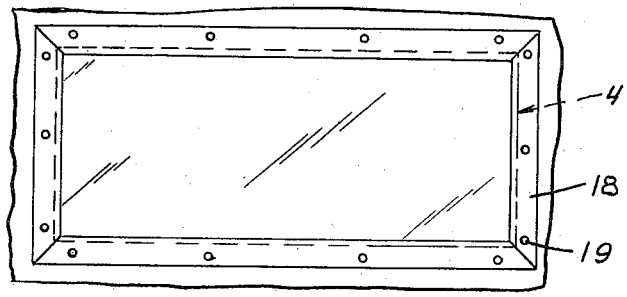
Figure 2:
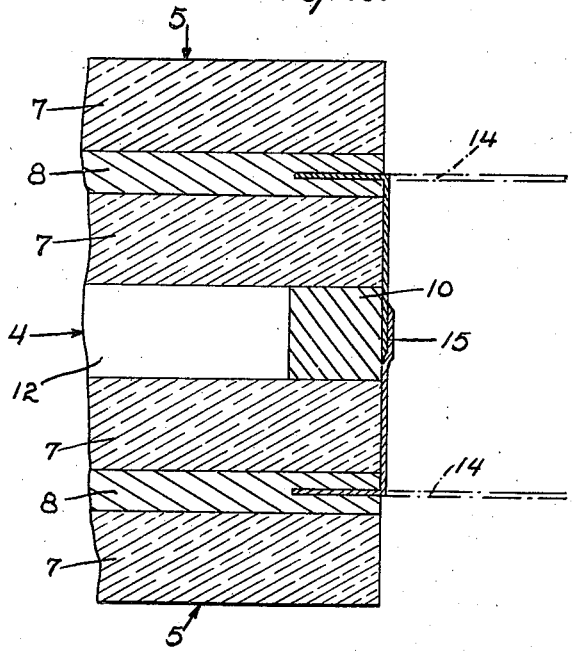

In the drawing, Figure 1 is a fragmentary elevational view of a construction including a glass insulation unit as contemplated by my invention, and Figure 2 is a fragmentary vertical sectional view of the glass insulation unit alone.

Referring to the drawing, an insulation unit 4 comprises a plurality of plates 5 of laminated glass, including sheets 7 of glass united by layers 8 of a plastic reinforcing material, arranged in parallel relation with a spacer 10 of a resilient material, such as rubber or synthetic resin, a metal, or a metal coated with a resilient material interposed therebetween to form an air chamber 12. The plates 5 are provided with continuous holders 14 of a flexible sheet metal or light metal foil which are embedded in the layers 8 and which project beyond the edges of the plates. The metal borders are bent inwardly and joined together at 15 by solder or otherwise to form a vapor barrier and to form a seal of the chamber 12 from communication with the atmosphere. The unit may be mounted in a wall opening by means of a frame 18 secured to the wall by spaced bolts 19 or other suitable means.

The metal borders 14 which may be formed of copper, lead, aluminum, zinc, etc. are incorporated in the laminated glass plates 5 during the manufacture thereof. For example, as the plates 5 are assembled, the borders, in the form of a hollow, rectangular frame of suitable dimensions or as strips of metal foil, are interposed between the glass sheets 7 covered by layers of plastic materials. Lamination under controlled heat and pressure welds the several elements into a composite unit with the borders forming an integral part thereof. It is, of course, necessary that the metal entering the borders 14 be sufficiently flexible to permit bending without rupture in order that the borders may be joined together. For this reason it is preferred to employ metal foil, although heavier sheet metal may be substituted thereof.

In assembling the units, the plates 5 are arranged in parallel relation and the spacer is interposed therebetween adjacent the edges of the plates. If desired, an adhesive may be employed to bond the spacer to one or both of the plates thus insuring permanent positioning thereof. The assembly is placed under slight compression in a suitable form and the borders are bent inwardly and united by soldering. This operation may be effected at temperatures sufficiently low to avoid deterioration of the spacer 10. If a metal spacer is used, the union of the borders may be accomplished by a welding operation.

The seal is completed around the entire assembly and the continuous metal band serves as an effective barrier preventing communication between the air chamber 12 and the atmosphere. The seal is of such nature that the plates 5 are free to undergo slight displacement from their relative positions because of temperature or pressure variations without destruction thereof.

It will at once be obvious that various modifications in the nature of the several elements and their combination into an insulation unit are possible without departing from the spirit of the invention or the scope of the appended claims.

What I claim is:

1. In a glass insulation structure, a plurality of laminated glass units each having a resinous interlayer, a flexible metal strip partially embedded in the interlayer between the glass plates of each unit and extending beyond the edges thereof, and a spacer interposed between the laminated units adjacent the edges thereof to form a chamber between said units, the metal strips having their outer portions disposed in bridging relation across the space between the edges of the laminated units and being integrally connected to form a sealing vapor barrier around the glass edges.

2. A double glazed structure comprising a pair of laminated glass units, each unit including a resinous interlayer, a metal strip having its inner marginal portion embedded in each interlayer free from contact with the glass and having its outer edge projecting from the interlayer beyond the glass edges, and a spacer interposed between the laminated units adjacent their edges to form a chamber, the outer marginal portions of the metal strips overlapping and constituting a bridge between the edges of the laminated units and also including a soldered seam to seal the glass edges in air tight relation.

BROOK J. DENNISON.